United States Patent [19]

Cannelongo et al.

[11] Patent Number: 5,779,364
[45] Date of Patent: Jul. 14, 1998

[54] TEMPERATURE SENSITIVE DEVICE FOR MEDICINE CONTAINERS

[76] Inventors: Joseph F. Cannelongo, 1462 Kedron La., Port Charlotte, Fla. 33983; Christy D. Cugini, Jr., 4754 Instermorle La., Sarasota, Fla. 33983

[21] Appl. No.: 688,150

[22] Filed: Jul. 29, 1996

Related U.S. Application Data

[63] Continuation-in-part of Ser. No. 429,792, Apr. 27, 1995, abandoned.

[51] Int. Cl.⁶ .................................................. G01K 11/06
[52] U.S. Cl. .............................. 374/160; 374/162; 116/217
[58] Field of Search ........................... 116/207, 216, 116/217, 218, 219; 374/106, 160, 162; 40/310; 206/459.1

[56] References Cited

U.S. PATENT DOCUMENTS

| | | | |
|---|---|---|---|
| 639,350 | 12/1899 | Brown | 40/310 |
| 1,535,536 | 4/1925 | MacDonald | 116/216 X |
| 3,047,405 | 7/1962 | Lanier | 116/217 X |
| 3,963,442 | 6/1976 | Bullard et al. | 116/201 X |
| 4,148,748 | 4/1979 | Hanlon et al. | 116/216 X |
| 4,390,291 | 6/1983 | Graven, Jr. et al. | 374/160 |
| 4,826,762 | 5/1989 | Klibanov et al. | 116/217 X |

*Primary Examiner*—William A. Cuchlinski, Jr.
*Assistant Examiner*—Willie Morris Worth
*Attorney, Agent, or Firm*—Charles J. Prescott

[57] ABSTRACT

A temperature indicator utilizing waxes, low-temperature melt metals or polymers attached to a support member that will melt to reveal a visible indicia on the support member thereby serving as an indicator that the product container to which the invention is attached has been heated beyond a predetermined stable temperature of the product.

3 Claims, 1 Drawing Sheet

BEFORE HEAT

AFTER HEAT

TEMPERATURE SENSITIVE DEVICE FOR MEDICINE CONTAINERS

BACKGROUND OF THE INVENTION

This application is a continuation-in-part of Ser. No. 08/429,792, filed Apr. 27, 1995 now abandoned.

SCOPE OF INVENTION

This invention relates generally to temperature indicators and more particularly to a device which irreversibly provides visible indicia that a medicine container and the like has been subjected to a temperature which exceeded a predetermined detrimental temperature to the medicine.

PRIOR ART

Many of the medications that are used have been shown to lose potency and efficacy when stored at temperature extremes. For example, the Physician's Desk Reference (PDR) recommends that insulin should be stored between 59° to 86° F. Insulin stored at 80° will lose approximately 1.5% of its potency over thirty days. A synopsis from an information request to the Lilly Research Laboratories stated "At elevated temperatures (over 86° F.), some insulins have shown to deteriorate, with a loss of potency which is accelerated as the temperature increases. The more commonly used human insulins have been reported to deteriorate at an accelerated rate when exposed to elevated temperatures.

As reported by R. Gregory, et al., in the journal *Diabetes Care*, exposure of insulin to increasing temperatures caused an increase in insulin transformation products. Insulin transformation products are altered forms of the native insulin. The consequences of insulin transformation is a potential loss of biological potency, formation of potentially immunogenic molecules, and an alteration of the pharmacokinetics and pharmacodynamics of the injected material. The altered pharmacokinetics of insulin can lead to delayed hypoglycemia and severe illness.

There are circumstances in which insulin can become exposed to excessive heat such as when traveling or when storing in an inappropriate place (i.e. near the stove). This may result in the insulin (or other medications) becoming exposed to extreme temperatures. Recently, it has become practice with many insurance plans to utilize large mail-order pharmaceutical houses. This has resulted in hoarding of medications such as insulin, because the plans require three to six months of medications to be sent at one time.

There are at least 14 million diabetics in the United States. Many of these individuals are administering their own insulin injections daily. These people often need to take their insulin on the job or when they are traveling. There are may occasions where there may be inadvertent exposure to excess heat thereby altering the efficacy of the medication. Presently, there are no simple ways of discerning that one's insulin (or other temperature-sensitive medication) has been exposed to elevated temperatures. However, applicants are aware of the following prior U.S. patents, none of which appear to teach a non-reversible "temperature exceeded" feature in conjunction with temperature sensitive medications.

| | |
|---|---|
| U.S. patent 3,125,984 | Okuyama |
| U.S. patent 3,233,459 | Gleason, et al. |
| U.S. patent 3,864,976 | Parker |
| U.S. patent 3,967,579 | Seiter |
| U.S. patent 4,028,944 | Erb |
| U.S. patent 4,280,441 | McNelly |
| U.S. patent 4,292,916 | Bradley, et al. |
| U.S. patent 4,333,339 | McNeely, et al. |
| U.S. patent 5,045,283 | Patel |
| U.S. patent 5,085,802 | Jalinski |

BRIEF SUMMARY OF THE INVENTION

This invention is directed to a temperature indicator utilizing waxes, low-temperature melt metals or polymers that will change color, melt, deform or otherwise provide a visible indicia, thereby serving as an indicator that a medication product container to which the invention is attached or closely positioned has been heated beyond a predetermined stable temperature of the product. If a product is stored or erroneously heated beyond its recommended storage temperature, the integrity and potency of such a product, especially medications i.e. insulin, calcitonin, growth hormone, furosemide injectable, glucocorticoids and the like are in question. The purpose of this invention is to provide a visible indicator alerting the consumer to the possible loss of efficacy or potency of a medication and, in turn, reduce the risk that illness may occur by using such tainted products.

It is therefore an object of this invention to provide an attachment to medicine containers which provides irreversible viewable indicia of having exceeded a predetermined temperature.

It is yet another object of this invention to provide viewable indicia which is permanently altered to advise that a medicine container has been exposed to temperatures which have exceeded a predetermined temperature level.

It is still another object of this invention to provide viewable indicia that insulin contained within a sealed bottle has been exposed to excess temperatures which may harm the contents and character of the insulin.

In accordance with these and other objects which will become apparent hereinafter, the instant invention will now be described with reference to the accompanying drawings.

DETAILED DESCRIPTION OF THE INVENTION

Figure 1:
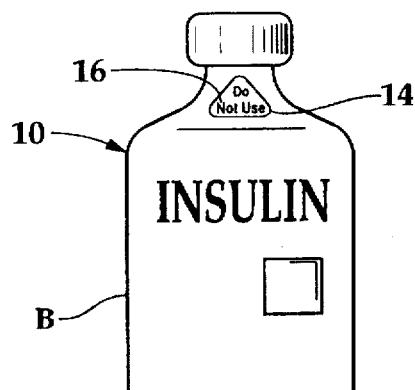
FIG. 1 is a front elevation view of an insulin container which has been exposed to a temperature in excess of a preselected value and wherein the viewable indicia of one embodiment of the invention has been permanently uncovered as a warning.
Figure 3:
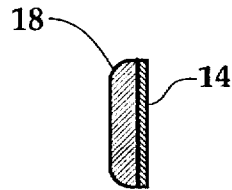
FIG. 3 is a section view of FIG. 2.
Figure 2:
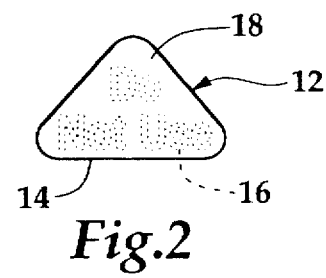
FIG. 2 is a front elevation view of the invention of FIG. 1 prior to excess temperature exposure.

Referring now to the drawings, and particularly to FIGS. 1 to 3, one embodiment of the invention is there shown generally at numeral 10 which includes a medicine bottle B containing a quantity of insulin. One embodiment of the invention as attached to the bottle is shown intact prior to excess temperature exposure in FIG. 2 at numeral 12. As best seen in FIGS. 2 and 3, this embodiment 12 includes a support substrate 14 which may be formed of paper or adhesive-backed material having a warning 16 (in hidden lines) printed on one surface thereof. A layer of wax 18 covers the warning or viewable indicia 16 prior to attachment to the bottle B as shown in FIG. 1 and prior to excess temperature exposure.

The wax member 18 is generally opaque so as to obliterate viewability of the warning indicia 16 until a preselected temperature has been exceeded. For example, Union Carbine Carbowax brand polyethylene glycol, a polymeric wax, will melt, deform or otherwise become rearranged from its original physical dimensions at a preselected temperature. The Union Carbide Product, number 1000, for example, melts at between 99° and 100° F. while product number 1440 melts at between 109° and 115° F. When those temperatures are reached, the wax 18 simply melts away so that the warning indicia 16 as seen in FIG. 1 is easily viewable to serve as a warning that the contents of the bottle B have likely been exposed to temperatures in excess of a predetermined level at which is selected in conjunction with the maximum temperature exposure tolerance of the insulin contained within the bottle B is exceeded.

Importantly, note that the melting of the wax layer 18 to expose viewable warning indicia 16 as in FIG. 1 is a nonreversible process so that once the preselected temperature of the "pastille" 18 has been reached, exposure of the warning indicia 16 is of a permanent, nonreversible occurrence. In addition to the warning indicia being in the form of readable words, a bright or easily noticed colored surface of the to-be-exposed surface of the support substrate 14 may be utilized.

Figure 4A:
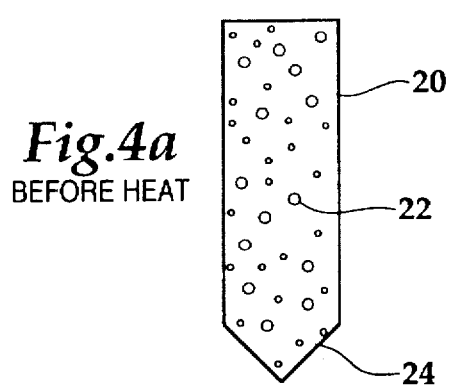
FIG. 4a is a front elevation view of another embodiment of the invention prior to excess heat exposure.
Figure 4B:
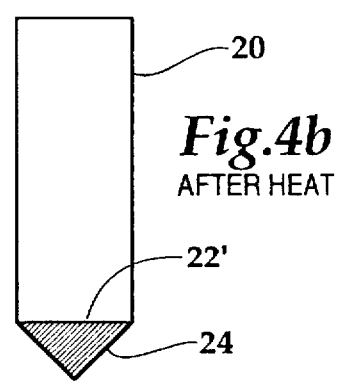
FIG. 4b is a view of the invention of 4a after excess heat exposure.

Referring now to FIGS. 4a and 4b, another embodiment of the invention is shown generally at 20 in FIG. 4a and 20' in FIG. 4b. The device 20 defines an enclosed volume at least partially filled with an expanded foam polymeric wax 22 which is viewable within the container 20. The container itself may be attached as by adhesive to the surface of a medicine container, accompany packaging within a box, or alternately, be placed in a storage area of medication or a pouch carrying case, purse or shipping containers therefor.

Should the expanded foam polymeric wax particles 22 exceed a predetermined temperature level, they will decrease in volume substantially so as to collect and condense in volume at a triangular lower end 24 of the container 20 at 22'. As viewable within the container 20, the condensed or shrunken wax 22' is easily viewable, the remainder of the container 20 then being clear to provide viewable indicia of the device 20 having exceeded its preselected temperature level.

Figure 5:
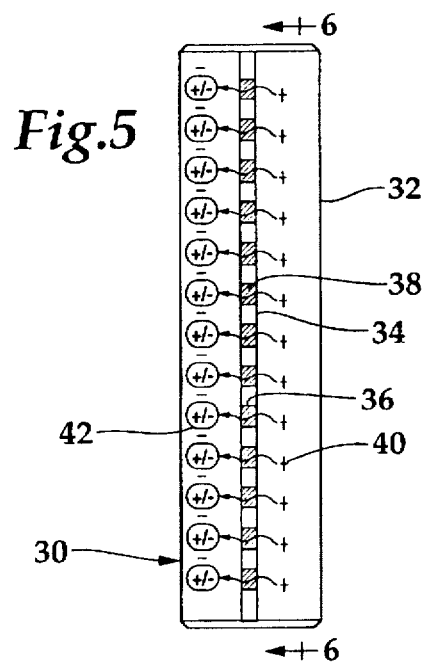
FIG. 5 is a front elevation view of another embodiment of the invention.
Figure 6:
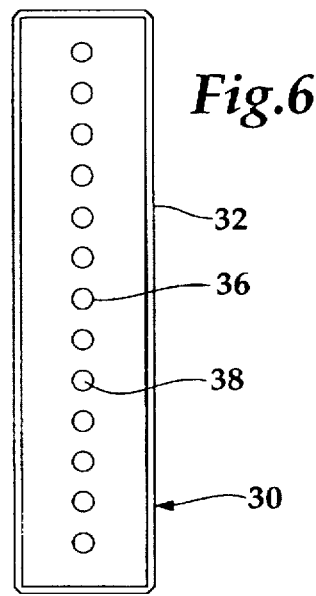
FIG. 6 is a section view in the direction of arrows 6—6 in FIG. 5.

Referring to FIGS. 5 and 6, another embodiment of the invention is there shown at numeral 30 and includes a transparent plastic vial 32 which contains an apertured partition 34 having a series of apertures 36 formed transversely therethrough. These apertures 36 are initially filled with polymeric wax 38 so as to sealably separate each component 40 and 42 of a liquid color reactant. Should the device 30 be exposed to a preselected elevated temperature, the wax 38 filling the apertures 36 will melt away so that the two components 40 and 42 of the color reactant will migrate toward one another or to the other side of the partition 34 as shown in FIG. 5 and mix to become a different color which is easily detectable by viewing.

Other irreversible color changing liquid crystals may be utilized in any of the above embodiments, which liquid crystals will irreversibly change color at a preselected temperature to provide the desired viewable indicia of excess temperature exposure. Certain low temperature melt metals, such as wood's metal may be substituted for the polymers or waxes above described.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A medicine safety device for a medicine container which contains a temperature-sensitive medication which loses intended medical efficacy when subjected to a temperature at or above a predetermined temperature, there being no viewable means otherwise provided for determining said loss of medical efficacy prior to taking or administrating said medication, said device consisting of:

a support member having an adhesive means on a first surface thereof for attaching said support member into an exterior surface of the container, a second surface of said support member which faces outwardly from the exterior surface having a viewable warning indicia thereon;

a temperature responsive member connected to said second surface and substantially covering said warning indicia from view, said temperature responsive member being a pastille formed of opaque wax which melts at a temperature substantially at or above the predetermined temperature whereby said warning indicia becomes viewable on the support member after the pastille has melted.

2. In a medicine container having a neck which is reduced in transverse width and which contains a temperature-sensitive medication which loses intended medical efficacy when subjected to a temperature at or above a predetermined temperature, there being no viewable means otherwise provided for determining said loss of medical efficacy prior to taking or administrating said medication, the improvement consisting essentially of:

a support member attached to an exterior surface of said container, an outwardly facing surface of said support member having a viewable warning indicia thereon;

said support member being attached to a narrow neck of said container between a cap end and an enlarged main body portion of said container;

a temperature responsive member connected to said second surface and substantially covering said warning indicia from view, said temperature responsive member being a pastille formed of opaque wax which melts at a temperature substantially at or above the predetermined temperature whereby said warning indicia becomes viewable on the support member after the pastille has melted.

3. In combination, a medicine container for a temperature-sensitive medication which loses intended medical efficacy when subjected to a temperature at or above a predetermined temperature and a medicine safety device attached to said medicine container comprising:

said medicine safety device including:

a support member attached to an exterior surface of said medicine container, an outwardly facing surface of said support member having a viewable warning indicia thereon;

a temperature responsive member connected to said outwardly facing surface and substantially covering said warning indicia from view, said temperature responsive member being a pastille formed of opaque wax which melts at a temperature substantially at or above the predetermined temperature whereby said warning indicia becomes viewable on the support member only after the pastille has melted;

said medicine container having a narrow cap, an enlarged main body portion and a narrow neck smaller in width than that of said main body portion;

said support member being attached to said narrow neck between said cap end and said main body portion whereby handling of said container will not cause said temperature responsive member to inadvertently melt.

* * * * *